(12) United States Patent
Mikayama et al.

(10) Patent No.: US 11,014,340 B2
(45) Date of Patent: May 25, 2021

(54) INTERMEDIATE FILM FOR LAMINATED GLASS, AND LAMINATED GLASS

(71) Applicant: SEKISUI CHEMICAL CO., LTD., Osaka (JP)

(72) Inventors: Kaoru Mikayama, Osaka (JP); Yasuharu Nagai, Osaka (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 492 days.

(21) Appl. No.: 14/917,510

(22) PCT Filed: Sep. 30, 2014

(86) PCT No.: PCT/JP2014/076142
§ 371 (c)(1),
(2) Date: Mar. 8, 2016

(87) PCT Pub. No.: WO2015/046583
PCT Pub. Date: Apr. 2, 2015

(65) Prior Publication Data
US 2016/0214355 A1 Jul. 28, 2016

(30) Foreign Application Priority Data

Sep. 30, 2013 (JP) .................................. 2013-204323

(51) Int. Cl.
*B32B 17/10* (2006.01)
*B32B 27/36* (2006.01)

(52) U.S. Cl.
CPC .. *B32B 17/10761* (2013.01); *B32B 17/10018* (2013.01); *B32B 17/10036* (2013.01);
(Continued)

(58) Field of Classification Search
CPC ........ B32B 17/10761; B32B 17/10743; B32B 27/36; B32B 17/10036; B32B 17/10018;
(Continued)

(56) References Cited

U.S. PATENT DOCUMENTS 4,154,615 A * 5/1979 Sato ...................... C08F 291/02
430/213
4,696,713 A * 9/1987 Okafuji ............. B32B 17/10862
156/358

(Continued)

FOREIGN PATENT DOCUMENTS

| CN | 101668715 A | 3/2010 |
| CN | 102256910 A | 11/2011 |

(Continued)

OTHER PUBLICATIONS

Reference: Polymer Properties, pp. 1-2, Sigma Aldrich.*

(Continued)

*Primary Examiner* — Alexander C Kollias
(74) *Attorney, Agent, or Firm* — Cheng Law Group, PLLC

(57) ABSTRACT

There is provided an interlayer film for laminated glass with which the sound insulating properties of laminated glass can be enhanced. The interlayer film 2 for laminated glass according to the present invention includes a polyvinyl acetal resin and a second resin component with a glass transition temperature higher than or equal to −15° C. and lower than or equal to 5° C., the content of the polyvinyl acetal resin is greater than or equal to 10% by weight and less than or equal to 50% by weight and the content of the second resin component is greater than or equal to 50% by weight and less than or equal to 90% by weight, in 100% by weight of the total of the polyvinyl acetal resin and the second resin component, and the polyvinyl acetal resin and
(Continued)

the second resin component form a sea-island structure in the interlayer film.

19 Claims, 1 Drawing Sheet

(52) U.S. Cl.
CPC ........ *B32B 17/10743* (2013.01); *B32B 27/36* (2013.01); *B32B 2250/03* (2013.01); *B32B 2250/40* (2013.01); *B32B 2307/102* (2013.01); *B32B 2605/006* (2013.01)

(58) Field of Classification Search
CPC .......... B32B 2250/03; B32B 2307/102; B32B 2250/40; B32B 2605/006; B32B 27/22; B32B 27/306; B32B 27/308; C03C 27/10
See application file for complete search history.

(56) References Cited

U.S. PATENT DOCUMENTS

| | | | |
|---|---|---|---|
| 6,383,647 B1* | 5/2002 | Shohi | B32B 17/10761 428/436 |
| 2004/0024137 A1* | 2/2004 | Kusudou | C08F 8/12 525/330.3 |
| 2004/0157078 A1* | 8/2004 | Yoshida | C09D 129/14 428/524 |
| 2005/0019536 A1* | 1/2005 | Rymer | B32B 17/10761 428/215 |
| 2010/0009172 A1 | 1/2010 | Morikawa et al. | |
| 2010/0015400 A1* | 1/2010 | Tokuchi | B32B 27/30 428/172 |
| 2011/0112247 A1* | 5/2011 | Tokuchi | C08L 33/12 525/57 |
| 2012/0021230 A1 | 1/2012 | Fukatani et al. | |
| 2013/0131233 A1 | 5/2013 | Fukatani et al. | |
| 2014/0014178 A1 | 1/2014 | Muguruma | |

FOREIGN PATENT DOCUMENTS

| | | | | |
|---|---|---|---|---|
| CN | 103080035 A | 5/2013 | | |
| EP | 2 360 207 A1 | 8/2011 | | |
| JP | 7-118347 A | 5/1995 | | |
| JP | 2000-272936 A | 10/2000 | | |
| JP | 2007-70200 A | 3/2007 | | |
| JP | 2007-297571 A | 11/2007 | | |
| JP | 2011173765 | * 9/2011 | ........... C04B 32/622 | |
| JP | 2014-224234 A | 12/2014 | | |
| WO | WO-2008/143195 A1 | 11/2008 | | |
| WO | WO-2012/026393 A1 | 3/2012 | | |

OTHER PUBLICATIONS

Technical tutorial—Misumi, pp. 1-2, Misumi Corp. 2018.*
English language translation of WO 2008/143195, pp. 1-10, Mar. 26, 2018.*
English language translation of Jp 2011-173765, pp. 1-9, Mar. 26, 2018.*
International Search Report for the Application No. PCT/JP2014/076142 dated Jan. 13, 2015.
Written Opinion of the International Searching Authority (PCT/ISA/237) for Application No. PCT/JP2014/076142 dated Jan. 13, 2015.
The First Office Action for the Application No. 201480031360.6 from The State Intellectual Property Office of the People's Republic of China dated May 4, 2017.
Supplementary European Search Report for the Application No. EP 14 84 8708 dated Jun. 1, 2017.
Written Opinion of the International Searching Authority (PCT/ISA/237) for Application No. PCT/JP2014/076142 dated Jan. 13, 2015 (English Translation mailed Apr. 14, 2016).

\* cited by examiner

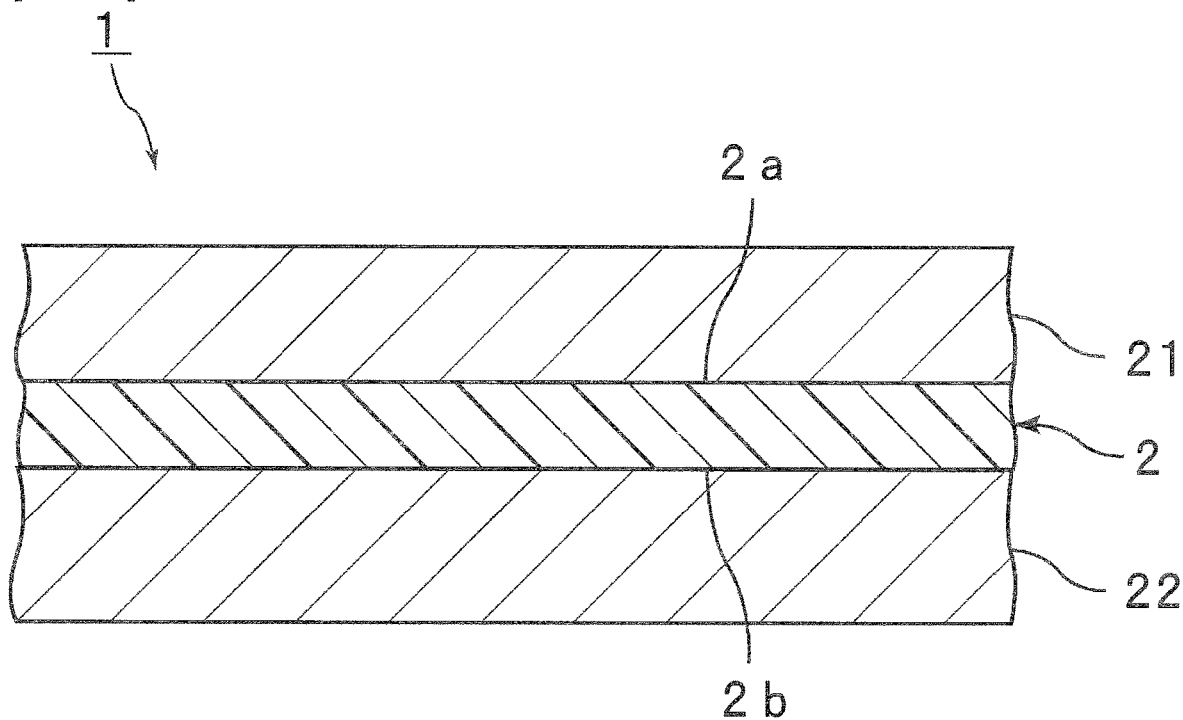
[FIG. 1]
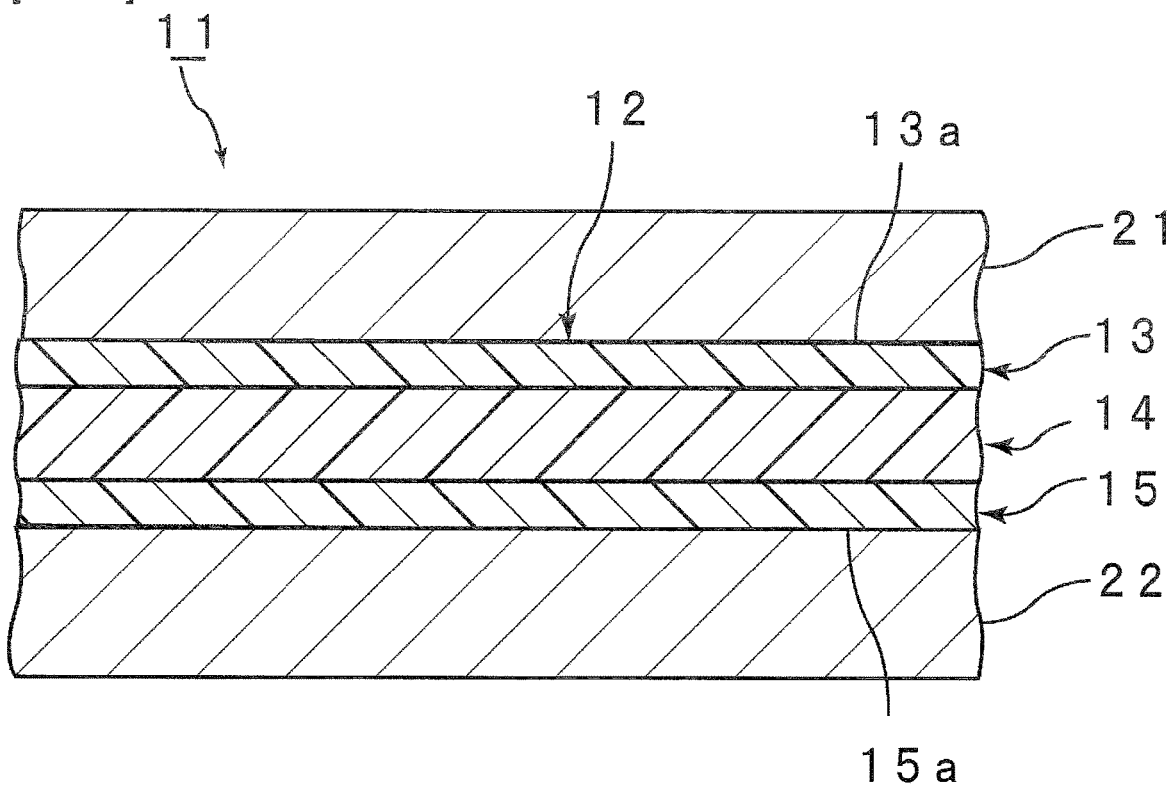
[FIG. 2]

INTERMEDIATE FILM FOR LAMINATED GLASS, AND LAMINATED GLASS

TECHNICAL FIELD

The present invention relates to an interlayer film for laminated glass used for obtaining laminated glass. Moreover, the present invention relates to laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. For example, the laminated glass is produced by sandwiching an interlayer film for laminated glass between a pair of glass plates.

In recent years, for the purpose of attaining reduced weight of laminated glass, a technique for allowing the laminated glass to be thinned in thickness has been studied. However, when the thickness of laminated glass is thinned, the sound insulating properties are decreased. In the case of using laminated glass low in sound insulating properties for a windshield of an automobile, or the like, against the sound in a sound area of 5000 Hz or so such as wind noises and driving sounds of a wiper device, there is a problem that sufficient sound insulating properties are not attained. For example, the sound insulating properties are sometimes decreased by a coincidence effect.

In this context, a coincidence effect refers to a phenomenon in which, when a sound wave is made incident into a glass plate, a transverse wave is propagated on the glass surface due to the rigidity and inertia of the glass plate, the transverse wave and the incident sound are resonant with each other, and as a result, the transmission of sound occurs.

Accordingly, a technique for enhancing the sound insulating properties of laminated glass by modifications of materials for the interlayer film has been studied.

For example, the following Patent Document 1 discloses a sound insulating layer including 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount greater than 30 parts by weight. This sound insulating layer can be used alone as a single-layered interlayer film or can be layered on another layer to be used as a multi-layered interlayer film.

RELATED ART DOCUMENT

Patent Document

Patent Document 1: JP 2007-070200 A

SUMMARY OF THE INVENTION

Problems to be Solved by the Invention

In the laminated glass prepared with the interlayer film described in the foregoing Patent Document 1, the sound insulating properties can be enhanced to some extent, but there has been a demand for further enhancing the sound insulating properties.

Moreover, in recent years, for the purpose of enhancing the sound insulating properties of laminated glass, a technique for adding an excess amount of a plasticizer to an interlayer film has also been studied. The sound insulating properties of laminated glass can be improved by adding an excess amount of a plasticizer to an interlayer film. However, in the case of using an excess amount of a plasticizer, the plasticizer may bleed out to the surface of the interlayer film.

Moreover, for the purpose of enhancing the sound insulating properties of laminated glass, with regard to a multi-layered interlayer film in which a plurality of layers are layered, a technique for allowing respective layers to be different from one another in content of the plasticizer used therefor has also been studied.

However, with regard to the multi-layered interlayer film, the plasticizer is allowed to transfer from a layer having a large content of the plasticizer to a layer having a small content of the plasticizer, and the plasticizer may bleed out to the surface of the interlayer film or the interfaces between respective layers. As a result, the interlayer film is sometimes changed in elastic modulus, the adhesivity of the interlayer film is sometimes decreased, and the sound insulating properties of laminated glass are sometimes decreased.

An object of the present invention is to provide an interlayer film for laminated glass with which the sound insulating properties of laminated glass can be enhanced, and to provide laminated glass prepared with the interlayer film for laminated glass.

Means for Solving the Problems

According to a broad aspect of the present invention, there is provided an interlayer film for laminated glass including a polyvinyl acetal resin and a second resin component with a glass transition temperature higher than or equal to $-15°$ C. and lower than or equal to $5°$ C.; and the content of the polyvinyl acetal resin being greater than or equal to 10% by weight and less than or equal to 50% by weight and the content of the second resin component being greater than or equal to 50% by weight and less than or equal to 90% by weight, in 100% by weight of the total of the polyvinyl acetal resin and the second resin component, and the polyvinyl acetal resin and the second resin component forming a sea-island structure in the interlayer film.

In a specific aspect of the interlayer film for laminated glass according to the present invention, the polyvinyl acetal resin and the second resin component form a sea-island structure in cooperation with each other in the interlayer film.

In a specific aspect of the interlayer film for laminated glass according to the present invention, the temperature showing the maximum value of the loss tangent derived from the polyvinyl acetal resin is higher than or equal to $50°$ C., the temperature showing the maximum value of the loss tangent derived from the second resin component is higher than or equal to $-15°$ C. and lower than or equal to $5°$ C., and the maximum value of the loss tangent derived from the second resin component is greater than or equal to 0.4, in a dynamic viscoelastic spectrum at the frequency of 1 Hz.

In a specific aspect of the interlayer film for laminated glass according to the present invention, the interlayer film further includes no plasticizer or a plasticizer in an amount less than or equal to 40% by weight in 100% by weight of the interlayer film. In the case where the interlayer film includes a plasticizer, the interlayer film includes a plasticizer preferably in an amount less than or equal to 20% by weight and more preferably in an amount less than or equal to 10% by weight, in 100% by weight of the interlayer film.

In a specific aspect of the interlayer film for laminated glass according to the present invention, the interlayer film further includes no plasticizer.

In a specific aspect of the interlayer film for laminated glass according to the present invention, at least a part of the polyvinyl acetal resin and at least a part of the second resin component are polymerized with each other.

In a specific aspect of the interlayer film for laminated glass according to the present invention, the second resin component is a (meth)acrylic resin.

In a specific aspect of the interlayer film for laminated glass according to the present invention, the second resin component is obtained by allowing monomers having a (meth)acryloyl group to undergo a polymerization in the presence of the polyvinyl acetal resin.

According to a broad aspect of the present invention, there is provided laminated glass including a first laminated glass member, a second laminated glass member and the above-described interlayer film for laminated glass, wherein the interlayer film for laminated glass is arranged between the first laminated glass member and the second laminated glass member.

Effect of the Invention

Since the interlayer film for laminated glass according to the present invention includes a polyvinyl acetal resin and a second resin component with a glass transition temperature higher than or equal to −15° C. and lower than or equal to 5° C., the content of the polyvinyl acetal resin is greater than or equal to 10% by weight and less than or equal to 50% by weight and the content of the second resin component is greater than or equal to 50% by weight and less than or equal to 90% by weight, in 100% by weight of the total of the polyvinyl acetal resin and the second resin component, and furthermore, the polyvinyl acetal resin and the second resin component form a sea-island structure in the interlayer film, the sound insulating properties of laminated glass prepared with the interlayer film for laminated glass according to the present invention can be enhanced.

BRIEF DESCRIPTION OF DRAWINGS

FIG. 1 is a partially cut-away sectional view showing laminated glass prepared with an interlayer film for laminated glass in accordance with one embodiment of the present invention.

FIG. 2 is a partially cut-away sectional view showing a modified example of laminated glass prepared with an interlayer film for laminated glass in accordance with one embodiment of the present invention.

MODE(S) FOR CARRYING OUT THE INVENTION

Hereinafter, the details of the present invention will be described.

The interlayer film for laminated glass according to the present invention includes a polyvinyl acetal resin and a second resin component with a glass transition temperature higher than or equal to −15° C. and lower than or equal to 5° C. For example, the interlayer film for laminated glass according to the present invention can be obtained by allowing a polyvinyl acetal resin composition to be formed into a film.

With regard to the interlayer film for laminated glass according to the present invention, the content of the polyvinyl acetal resin is greater than or equal to 10% by weight and less than or equal to 50% by weight and the content of the second resin component is greater than or equal to 50% by weight and less than or equal to 90% by weight, in 100% by weight of the total of the polyvinyl acetal resin and the second resin component.

Furthermore, in the interlayer film for laminated glass according to the present invention, the polyvinyl acetal resin and the second resin component form a sea-island structure. Since the sound insulating properties of laminated glass prepared with the interlayer film for laminated glass according to the present invention can be further enhanced, it is preferred that the polyvinyl acetal resin and the second resin component form a sea-island structure in cooperation with each other in the interlayer film for laminated glass according to the present invention.

In the interlayer film for laminated glass according to the present invention, the polyvinyl acetal resin may exist in the state of being alone and the polyvinyl acetal resin may react with the second resin component. In the interlayer film for laminated glass according to the present invention, the second resin component may exist in the state of being alone and the second resin component may react with the polyvinyl acetal resin. For example, at the interface between a sea part and an island part, the polyvinyl acetal resin and the second resin component may react with each other. With regard to this reactant, a portion derived from the polyvinyl acetal resin is defined as a portion contained in the polyvinyl acetal resin, and a portion derived from the second resin component is defined as a portion contained in the second resin component. The polyvinyl acetal resin is composed of the polyvinyl acetal resin as a simple body and the portion derived from the polyvinyl acetal resin in a reactant of the polyvinyl acetal resin and the second resin component. The second resin component is composed of the second resin component as a simple body and the portion derived from the second resin component in a reactant of the polyvinyl acetal resin and the second resin component.

By adopting the above-described configuration in the interlayer film for laminated glass according to the present invention, the sound insulating properties of laminated glass can be enhanced.

Hereinafter, the interlayer film for laminated glass according to the present invention will be described in more detail.

In the interlayer film, the polyvinyl acetal resin and the second resin component form a sea-island structure. The vibrational energy is absorbed by the shearing deformation which occurs at the interface of a sea-island structure, and the excellent sound insulating properties are exerted in a wide temperature range. For the purpose of allowing such an effect to be exerted, in the interlayer film, in 100% by weight of the total of the polyvinyl acetal resin and the second resin component, the content of the polyvinyl acetal resin is limited so as to be greater than or equal to 10% by weight and less than or equal to 50% by weight and the content of the second resin component is limited so as to be greater than or equal to 50% by weight and less than or equal to 90% by weight. When the content of the second resin component is too large, the content of the polyvinyl acetal resin is too small, the content of the second resin component is too small, or the content of the polyvinyl acetal resin is too large, with regard to the maximum value of the loss tangent in a dynamic viscoelastic spectrum, a satisfactory value is sometimes not exhibited, and the sound insulating properties are sometimes decreased.

In the interlayer film, in 100% by weight of the total of the polyvinyl acetal resin and the second resin component, the content of the polyvinyl acetal resin is preferably greater than or equal to 12% by weight, more preferably greater than or equal to 15% by weight, further preferably greater than or equal to 20% by weight, preferably less than or equal to 45% by weight, more preferably less than or equal to 40% by weight and further preferably less than or equal to 35% by weight, and the content of the second resin component is preferably greater than or equal to 55% by weight, more preferably greater than or equal to 60% by weight, further preferably greater than or equal to 65% by weight, preferably less than or equal to 88% by weight, more preferably less than or equal to 85% by weight and further preferably less than or equal to 80% by weight.

With regard to a preferred form of the sea-island structure, it is preferred that the island part have a nearly spherical shape and be dispersed in the continuous phase (sea), and the average diameter of respective island parts is preferably greater than or equal to 0.1 µm and preferably less than or equal to 10 µm. By allowing the island part to have a nearly spherical shape, since the area of the interface between the sea part and the island part is further increased and a larger amount of vibrational energy is absorbed, the sound insulating properties of the interlayer film are further enhanced. The sea-island structure constituted of the polyvinyl acetal resin and the second resin component in the interlayer film can be confirmed by observing the interlayer film. For the observation, an optical microscope, a transmission electron microscope, a scanning electron microscope, a phase contrast microscope, a polarization microscope, a scanning tunneling microscope, a microscopic Raman, or the like is used.

For example, a blending method and a two-stage reaction method are adoptable for the production of the interlayer film. The blending method is a method of separately preparing the polyvinyl acetal resin and the second resin component and then mixing (blending) the two. As the mixing method, a method of mixing melt-kneaded products, a method of mixing solutions, or the like is usable. The two-stage reaction method is a method of performing a polymerization of a compound constituting the second resin component in the presence of the polyvinyl acetal resin. In an interlayer film obtained after being subjected to this two-stage reaction method, as compared with the blending method, the island part of the sea-island structure becomes small. This is because, at the time of the polymerization of a compound constituting the second resin component, such a polymer that a reactant of a compound constituting the second resin component is grafted to the polyvinyl acetal resin is partially generated, and this exerts an action of the surfactant having an affinity with both of the sea part and the island part and stabilizes the island part. The present inventors have found that the thus formed interlayer film in which the island part is small has more excellent mechanical strength. Accordingly, the two-stage reaction method is suitable for the production of the interlayer film.

Hereinafter, the details of each ingredient which constitutes the interlayer film for laminated glass according to the present invention will be described.

(Polyvinyl Acetal Resin)

In a dynamic viscoelastic spectrum at the frequency of 1 Hz of the interlayer film, the temperature showing the maximum value of the loss tangent derived from the polyvinyl acetal resin is preferably higher than or equal to 50° C., more preferably higher than or equal to 60° C., and further preferably higher than or equal to 64° C. The temperature showing the maximum value of the loss tangent derived from the polyvinyl acetal resin may be lower than or equal to 100° C.

For example, the polyvinyl acetal resin can be produced by acetalizing polyvinyl alcohol with an aldehyde. For example, the polyvinyl alcohol can be obtained by saponifying polyvinyl acetate. The saponification degree of the polyvinyl alcohol is preferably greater than or equal to 70% by mole, more preferably greater than or equal to 80% by mole, further preferably greater than or equal to 85% by mole, less than or equal to 100% by mole, preferably less than or equal to 99.9% by mole, and more preferably less than or equal to 99.8% by mole.

The average polymerization degree of the polyvinyl alcohol is preferably greater than or equal to 200, more preferably greater than or equal to 500, further preferably greater than or equal to 800, preferably less than or equal to 5000, more preferably less than or equal to 4500, further preferably less than or equal to 3500, and especially preferably less than or equal to 3000. When the average polymerization degree is greater than or equal to the above lower limit, the penetration resistance of laminated glass is further enhanced. When the average polymerization degree is less than or equal to the above upper limit, the resin is easily formed into an interlayer film. In this connection, the average polymerization degree of the polyvinyl alcohol is determined by a method in accordance with JIS K6726 "Testing methods for polyvinyl alcohol".

From the viewpoint of further enhancing the mechanical strength of the interlayer film, it is preferred that the polyvinyl acetal resin be a polyvinyl acetal resin with a saponification degree greater than or equal to 80% by mole and an average polymerization degree greater than or equal to 800 and less than or equal to 5000, and it is more preferred that the polyvinyl acetal resin be a polyvinyl acetal resin with a saponification degree greater than or equal to 85% by mole and an average polymerization degree greater than or equal to 1000 and less than or equal to 4500.

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin be 3 or 4. When the number of carbon atoms of the acetal group in the polyvinyl acetal resin is greater than or equal to 3, the glass transition temperature of the interlayer film is sufficiently lowered.

The aldehyde is not particularly limited. In general, as the aldehyde, an aldehyde with 1 to 10 carbon atoms is suitably used. Examples of the aldehyde with 1 to 10 carbon atoms include formaldehyde (including paraformaldehyde), acetaldehyde (including paracetaldehyde), propionaldehyde, n-butyraldehyde, isobutyraldehyde, n-valeraldehyde, 2-ethylbutyraldehyde, n-hexylaldehyde, n-heptylaldehyde, n-octylaldehyde, n-nonylaldehyde, n-decylaldehyde, cyclohexylaldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, β-phenylpropionaldehyde and the like. Of these, from the viewpoint of further improving the balance of productivity and characteristics of the interlayer film, formaldehyde, acetaldehyde, n-butyraldehyde, isobutyraldehyde, cyclohexylaldehyde or benzaldehyde is preferred, n-butyraldehyde or isobutyraldehyde is more preferred, and n-butyraldehyde is further preferred. One kind of the aldehyde may be used alone, and two or more kinds thereof may be combinedly used.

The content ratio of the hydroxyl group (the amount of hydroxyl groups) of the polyvinyl acetal resin is preferably greater than or equal to 15% by mole, more preferably greater than or equal to 18% by mole, further preferably greater than or equal to 20% by mole, especially preferably greater than or equal to 25% by mole, most preferably greater than or equal to 28% by mole, preferably less than or equal to 40% by mole, more preferably less than or equal to 35% by mole, further preferably less than or equal to 34% by mole, and especially preferably less than or equal to 32% by mole. When the content ratio of the hydroxyl group is greater than or equal to the above lower limit, the adhesive force of the interlayer film is further enhanced. Moreover, when the content ratio of the hydroxyl group is less than or equal to the above upper limit, the flexibility of the interlayer film is enhanced and the handling of the interlayer film is facilitated.

The content ratio of the hydroxyl group of the polyvinyl acetal resin is a value expressing the mole fraction determined by dividing the amount of ethylene groups to which the hydroxyl group is bonded by the total amount of ethylene groups in the main chain in terms of percentage. For example, the amount of ethylene groups to which the hydroxyl group is bonded can be measured in accordance with JIS K6726 "Testing methods for polyvinyl alcohol" or in accordance with ASTM D1396-92 to be determined.

The acetylation degree (the amount of acetyl groups) of the polyvinyl acetal resin is preferably greater than or equal to 0.1% by mole, more preferably greater than or equal to 0.3% by mole, further preferably greater than or equal to 0.5% by mole, preferably less than or equal to 30% by mole, more preferably less than or equal to 25% by mole, further preferably less than or equal to 20% by mole, and especially preferably less than or equal to 15% by mole. When the acetylation degree is greater than or equal to the above lower limit, the compatibility between the polyvinyl acetal resin and a plasticizer is enhanced. When the acetylation degree is less than or equal to the above upper limit, the moisture resistance of the interlayer film and laminated glass is enhanced.

The acetylation degree is a value expressing the mole fraction determined by dividing a value obtained by subtracting the amount of ethylene groups to which the acetal group is bonded and the amount of ethylene groups to which the hydroxyl group is bonded from the total amount of ethylene groups in the main chain by the total amount of ethylene groups in the main chain in terms of percentage. For example, the amount of ethylene groups to which the acetal group is bonded can be measured in accordance with JIS K6728 "Testing methods for polyvinyl butyral" or in accordance with ASTM D1396-92.

The acetalization degree of the polyvinyl acetal resin (the butyralization degree in the case of a polyvinyl butyral resin) is preferably greater than or equal to 40% by mole, more preferably greater than or equal to 60% by mole, further preferably greater than or equal to 63% by mole, preferably less than or equal to 85% by mole, more preferably less than or equal to 80% by mole, further preferably less than or equal to 75% by mole, and especially preferably less than or equal to 70% by mole. When the acetalization degree is greater than or equal to the above lower limit, the compatibility between the polyvinyl acetal resin and a plasticizer is enhanced, furthermore, the hydrogen bond between molecules of the polyvinyl acetal resin does not become too strong, and the flexibility of the interlayer film is further exhibited. When the acetalization degree is less than or equal to the above upper limit, the reaction time required for producing the polyvinyl acetal resin is shortened, furthermore, the hydrogen bond between molecules of the polyvinyl acetal resin does not become too weak, and the strength of the interlayer film is further enhanced.

The acetalization degree is a value expressing the mole fraction determined by dividing the amount of ethylene groups to which the acetal group is bonded by the total amount of ethylene groups in the main chain in terms of percentage.

The acetalization degree can be calculated by measuring the acetylation degree and the content ratio of the hydroxyl group by a method in accordance with JIS K6728 "Testing methods for polyvinyl butyral" or a method in accordance with ASTM D1396-92, calculating the mole fraction from the measurement results obtained, and then subtracting the acetylation degree and the content ratio of the hydroxyl group from 100% by mole.

In this connection, it is preferred that the content ratio of the hydroxyl group (the amount of hydroxyl groups), the acetalization degree (the butyralization degree) and the acetylation degree be calculated from the results measured by a method in accordance with JIS K6728 "Testing methods for polyvinyl butyral". In the case where the polyvinyl acetal resin is a polyvinyl butyral resin, it is preferred that the content ratio of the hydroxyl group (the amount of hydroxyl groups), the acetalization degree (the butyralization degree) and the acetylation degree be calculated from the results measured by a method in accordance with JIS K6728 "Testing methods for polyvinyl butyral".

(Second Resin Component)

The glass transition temperature of the second resin component is higher than or equal to −15° C. and lower than or equal to 5° C. From the viewpoint of further enhancing the sound insulating properties, in a dynamic viscoelastic spectrum at the frequency of 1 Hz of the interlayer film, the temperature showing the maximum value of the loss tangent derived from the second resin component is preferably higher than or equal to −15° C. and preferably lower than or equal to 5° C., and furthermore, the maximum value of the loss tangent derived from the second resin component is preferably greater than or equal to 0.35, more preferably greater than or equal to 0.4 and further preferably greater than or equal to 0.5. The maximum value of the loss tangent derived from the second resin component is especially preferably greater than or equal to 1.

The second resin component is not particularly limited, and examples thereof include silicone rubber, polyisoprene, polybutadiene, polyisobutylene, polyethylene, polypropylene, polyvinylidene chloride, polyvinylidene fluoride, a (meth)acrylic resin such as a poly(meth)acrylic acid ester, polyacetal, polyurethane, polyoxymethylene, polyoxyethylene and the like. Of these, a (meth)acrylic resin is preferred, and it is preferred that the (meth)acrylic resin be a poly (meth)acrylic acid ester. As the second resin component, a polybutadiene elastomer and a styrene/butadiene copolymer may be used. By the use of these preferred second resin components, the glass transition temperature becomes easy to be further easily controlled, the temperature showing the maximum value of the loss tangent derived from the second resin component can be controlled within a suitable range, the transparency of the interlayer film is further improved, and the sound insulating properties within a wide temperature range can be further enhanced.

The smaller the difference between the refractive index of the polyacetal resin and the refractive index of the second resin component is, the more the transparency of the interlayer film is further enhanced. Examples of a method for adjusting the refractive index of the second resin component include a method of allowing monomers differing in refractive index to undergo a copolymerization, and a method of allowing a monomer with a refractive index differing from that of a monomer constituting the main chain component to be polymerized to the main chain.

The poly(meth)acrylic acid ester is not particularly limited. At the time of allowing a poly(meth)acrylic acid ester to be used alone and measured, it is preferred that the temperature showing the maximum value of the loss tangent be higher than or equal to −15° C. and lower than or equal to 5° C. in a dynamic viscoelastic spectrum at the frequency of 1 Hz.

Examples of the poly(meth)acrylic acid ester include poly(methyl (meth)acrylate), poly(ethyl (meth)acrylate), poly(n-propyl (meth)acrylate), poly(i-propyl (meth)acrylate), poly(n-butyl (meth)acrylate), poly(i-butyl (meth)acrylate), poly(t-butyl (meth)acrylate) poly(2-ethylhexyl (meth) acrylate), poly(octyl (meth)acrylate) poly(propyl (meth) acrylate) poly(2-ethyloctyl (meth)acrylate), poly(nonyl (meth)acrylate), poly(isononyl (meth)acrylate), poly(decyl (meth)acrylate), poly(isodecyl (meth)acrylate), poly(lauryl (meth)acrylate), poly(isotetradecyl (meth)acrylate), poly (cyclohexyl (meth)acrylate), poly(benzyl (meth)acrylate), and the like. Of these, a polyacrylic acid ester is preferred and poly(ethyl acrylate), poly(n-butyl acrylate), poly(2-ethylhexyl acrylate) or poly(octyl acrylate) is more preferred because the temperature showing the maximum value of the loss tangent can be easily controlled within the above-mentioned range in a dynamic viscoelastic spectrum. By the use of these preferred poly(meth)acrylic acid esters, the productivity of the interlayer film and the balance of characteristics of the interlayer film are further improved. One kind of the poly(meth)acrylic acid ester may be used alone, and two or more kinds thereof may be combinedly used.

As a component constituting the second resin component, a compound having a (meth)acryloyl group may be used. The second resin component may be obtained by allowing a compound having a (meth)acryloyl group to undergo a polymerization.

The second resin component may have a crosslinked structure. By allowing the second resin component to have a crosslinked structure, it is possible to control the elastic modulus and to prepare an interlayer film having both excellent flexibility and high strength. Examples of a method for allowing the second resin component to be crosslinked include a method of allowing functional groups reactive with each other to be previously introduced into the polymer structure of the resin and allowing the crosslinkage to be formed, a method of using a crosslinking agent having two or more functional groups reactive against functional groups existing in the polymer structure of the resin and allowing the second resin component to be crosslinked, a method of using a radical generator having hydrogen extracting performance such as a peroxide and allowing the polymer to be crosslinked, a method of allowing the second resin component to be crosslinked by electron beam irradiation, and the like. Of these, a method of allowing functional groups reactive with each other to be previously introduced into the polymer structure of the resin and allowing the crosslinkage to be formed is suitable because the sea-island structure is easily controlled and the productivity of the interlayer film is enhanced.

(Compatibilizer)

The interlayer film may include a compatibilizer. The compatibilizer is appropriately selected so that the sea-island structure can be satisfactorily maintained. The compatibilizer is not particularly limited, and examples thereof include a block copolymer or a graft copolymer of a polyvinyl acetal resin and a second resin component (particularly, a block copolymer or a graft copolymer of a polyvinyl acetal resin and a (meth)acrylate), a compatibilizer having an ionic interaction, and the like. Examples of the compatibilizer having an ionic interaction include a compound having a specific functional group, and the compound may be a polymer.

In the interlayer film, relative to 100 parts by weight of the total of the polyvinyl acetal resin and the second resin component, the content of the compatibilizer is greater than or equal to 0 part by weight (not used), more preferably greater than or equal to 0.01 part by weight, and preferably less than or equal to 20 parts by weight.

(Plasticizer)

It is preferred that the interlayer film include no plasticizer or a plasticizer in an amount less than or equal to 40% by weight in 100% by weight of the interlayer film. In the case where the interlayer film includes a plasticizer, the interlayer film includes a plasticizer more preferably in an amount less than or equal to 30% by weight, further preferably in an amount less than or equal to 20% by weight, and especially preferably in an amount less than or equal to 10% by weight, in 100% by weight of the interlayer film. It is more preferred that the interlayer film include no plasticizer. That is, in the case where the interlayer film includes a plasticizer, it is good to make the content of the plasticizer smaller. The smaller the content of the plasticizer is, the more the plasticizer becomes difficult to transfer from one resin to another, the sound insulating properties of the interlayer film are exerted further stably over a long period of time from immediately after the preparation thereof, and other various physical properties of the interlayer film become further difficult to be changed. For example, with regard to a multi-layered interlayer film in which a plurality of layers are layered and respective layers differ in content of the plasticizer, the multi-layered interlayer film is sometimes changed in physical properties until the transfer of the plasticizer arrives at an equilibrium state. In contrast, with regard to the interlayer film according to the present invention, it is possible to suppress the physical properties from being changed with the lapse of time and it is also possible to shorten the production process. Moreover, when the content of the plasticizer is small, the interlayer film can be reduced in weight. As such, for example, it is possible to further improve fuel consumption of an automobile prepared with laminated glass provided with the interlayer film.

In the case where the interlayer film includes a plasticizer, it is preferred that the plasticizer be a diester plasticizer represented by the following formula (1).

[Chemical Formula 1]

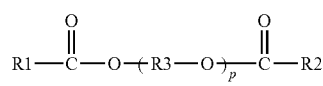

Formula (1)

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer be triethylene glycol di-2-ethylhexanoate (3GO), triethylene glycol di-2-ethylbutyrate (3GH) or triethylene glycol di-2-ethylpropanoate, it is more preferred that the plasticizer be triethylene glycol di-2-ethylhexanoate or triethylene glycol di-2-ethylbutyrate, and it is further preferred that the plasticizer be triethylene glycol di-2-ethylhexanoate.

(Other Ingredients)

The above-mentioned interlayer film may include additives such as an oxidation inhibitor, an ultraviolet ray shielding agent, a light stabilizer, a flame retardant, an antistatic agent, a pigment, a dye, an adhesive force regulating agent, a moisture-resistance agent, a fluorescent brightening agent, and an infrared ray absorber, as necessary.

(Other Details of Interlayer Film for Laminated Glass)

The thickness of the interlayer film for laminated glass according to the present invention is not particularly limited. From the viewpoint of the practical aspect and the viewpoint of sufficiently enhancing the heat shielding properties, the thickness of the interlayer film is preferably greater than or equal to 0.1 mm, more preferably greater than or equal to 0.25 mm, preferably less than or equal to 3 mm, and more preferably less than or equal to 1.5 mm. When the thickness of the interlayer film is greater than or equal to the above lower limit, the penetration resistance of laminated glass is enhanced.

(Laminated Glass)

FIG. 1 shows an example of laminated glass prepared with an interlayer film for laminated glass in accordance with one embodiment of the present invention represented as a sectional view.

Laminated glass 1 shown in FIG. 1 is provided with an interlayer film 2, a first laminated glass member 21 and a second laminated glass member 22. The interlayer film 2 is a single-layered interlayer film. The interlayer film 2 is used for obtaining laminated glass. The interlayer film 2 is an interlayer film for laminated glass.

The interlayer film 2 is arranged between the first laminated glass member 21 and the second laminated glass member 22 to be sandwiched. The first laminated glass member 21 is layered on a first surface 2a (one surface) of the interlayer film 2. The second laminated glass member 22 is layered on a second surface 2b (the other surface) opposite to the first surface 2a of the interlayer film 2.

FIG. 2 shows a modified example of laminated glass prepared with an interlayer film for laminated glass in accordance with one embodiment of the present invention represented as a sectional view.

Laminated glass 11 shown in FIG. 2 is provided with an interlayer film 12, the first laminated glass member 21 and the second laminated glass member 22. The interlayer film 12 is a multi-layered interlayer film. The interlayer film 12 is used for obtaining laminated glass. The interlayer film 12 is an interlayer film for laminated glass.

The interlayer film 12 has a structure in which three interlayer films of a first layer 13 (an interlayer film), a second layer 14 (an interlayer film) and a third layer 15 (an interlayer film) are layered in this order. In the present embodiment, the second layer 14 is a sound insulating layer. As the second layer 14, the interlayer film in accordance with one embodiment of the present invention is used. The first layer 13 and the third layer 15 are protective layers. The first layer 13 and the third layer 15 may also be interlayer films in accordance with the embodiment of the present invention.

The interlayer film 12 is arranged between the first laminated glass member 21 and the second laminated glass member 22 to be sandwiched. The second layer 14 (an interlayer film) is also interposed between the first layer 13 and the third layer 15 to be arranged between the first laminated glass member 21 and the second laminated glass member 22. The first laminated glass member 21 is layered on an outer surface 13a of the first layer 13. The second laminated glass member 22 is layered on an outer surface 15a of the third layer 15.

As described above, the laminated glass according to the present invention is provided with the first laminated glass member, the second laminated glass member and the interlayer film for laminated glass according to the present invention, and the interlayer film for laminated glass is arranged between the first laminated glass member and the second laminated glass member. The laminated glass may be provided with only the interlayer film for laminated glass according to the present invention, as the interlayer film, and may be provided with the interlayer film for laminated glass according to the present invention and another interlayer film for laminated glass. The interlayer film for laminated glass according to the present invention may be layered on another interlayer film for laminated glass to be used. The laminated glass includes at least the interlayer film for laminated glass according to the present invention.

Examples of the laminated glass member include a glass plate and a PET (polyethylene terephthalate) film and the like. As the laminated glass, laminated glass in which an interlayer film is arranged between a glass plate and a PET film or the like, as well as laminated glass in which an interlayer film is arranged between two glass plates, is included. Laminated glass is a laminate provided with a glass plate, and it is preferred that at least one glass plate be used.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, net-reinforced plate glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

The thickness of the laminated glass member is preferably greater than or equal to 1 mm, preferably less than or equal to 5 mm, and more preferably less than or equal to 3 mm. Moreover, in the case where the laminated glass member is a glass plate, the thickness of the glass plate is preferably greater than or equal to 1 mm, preferably less than or equal to 5 mm, and more preferably less than or equal to 3 mm. In the case where the laminated glass member is a PET film, the thickness of the PET film is preferably greater than or equal to 0.03 mm and preferably less than or equal to 0.5 mm.

The production method of the laminated glass is not particularly limited. For example, an interlayer film is sandwiched between a first laminated glass member and a second laminated glass member, and the air remaining between the first laminated glass member and the interlayer film and between the second laminated glass member and the interlayer film is removed by allowing the members to pass through a pressing roll or by putting the members into a rubber bag and allowing the contents to be sucked under reduced pressure. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

The interlayer film and the laminated glass can be used for automobiles, railway vehicles, aircraft, ships, buildings and the like. The interlayer film and the laminated glass can also be used for applications other than these applications. It is preferred that the interlayer film and the laminated glass be an interlayer film and laminated glass for vehicles or for construction, and it is more preferred that the interlayer film and the laminated glass be an interlayer film and laminated glass for vehicles. The interlayer film and the laminated glass can be used for a windshield, side glass, rear glass or roof glass of an automobile and the like.

Hereinafter, the present invention will be described in more detail with reference to examples. The present invention is not limited only to these examples.

Example 1

Preparation of Film Formed of Polyvinyl Acetal Resin Composition

In a reaction vessel equipped with a thermometer, a stirrer, a nitrogen inlet tube and a condenser, 10 parts by weight of a polyvinyl acetal resin (a polyvinyl butyral resin, the average polymerization degree of 1700, the butyralization degree of 67.0% by mole, the content ratio of the hydroxyl group of 32.0% by mole, the acetylation degree of 1.0% by mole), 30 parts by weight of ethyl acrylate and 60 parts by weight of ethyl acetate, which is a polymerization solvent, were placed and the polyvinyl acetal resin was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, the obtained solution was applied on top of a PET (polyethylene terephthalate) film subjected to a release treatment, and dried for 1 hour at 80° C. to obtain a film formed of a polyvinyl acetal resin composition.

(Preparation of Interlayer Film)

The obtained film formed of the polyvinyl acetal resin composition was molded using an extruder to prepare a single-layered interlayer film with a thickness of 0.5 mm.

(Preparation of Laminated Glass)

The obtained interlayer film was cut into a size of 30 mm in longitudinal length by 320 mm in transversal length. Next, the interlayer film was sandwiched between two sheets of transparent float glass (25 mm in longitudinal length by 305 mm in transversal length by 2.0 mm in thickness), held in place for 30 minutes at 90° C. and pressed under vacuum with a vacuum laminator to obtain a laminate.

With regard to the laminate, interlayer film portions protruded from the sheet of glass were cut away to obtain a sheet of laminated glass used for the measurement of the loss factor.

Example 2

Preparation of Film Formed of Polyvinyl Acetal Resin Composition

In a reaction vessel equipped with a thermometer, a stirrer, a nitrogen inlet tube and a condenser, 10 parts by weight of a polyvinyl acetal resin (a polyvinyl butyral resin, the average polymerization degree of 1700, the butyralization degree of 68.0% by mole, the content ratio of the hydroxyl group of 30.8% by mole, the acetylation degree of 1.2% by mole), 15 parts by weight of ethyl acrylate, 7.5 parts by weight of 2-ethylhexyl acrylate, 7.5 parts by weight of benzyl acrylate and 60 parts by weight of ethyl acetate, which is a polymerization solvent, were placed and the polyvinyl acetal resin was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, the obtained solution was applied on top of a PET film subjected to a release treatment, and dried for 1 hour at 80° C. to obtain a film formed of a polyvinyl acetal resin composition.

(Preparation of Interlayer Film)

An interlayer film was prepared by the same procedure as that in Example 1.

(Preparation of Laminated Glass)

A sheet of laminated glass was prepared by the same procedure as that in Example 1.

Example 3

Preparation of Film Formed of Polyvinyl Acetal Resin Composition

In a reaction vessel equipped with a thermometer, a stirrer, a nitrogen inlet tube and a condenser, 5 parts by weight of a polyvinyl acetal resin (a polyvinyl butyral resin, the average polymerization degree of 1700, the butyralization degree of 67.0% by mole, the content ratio of the hydroxyl group of 32.0% by mole, the acetylation degree of 1.0% by mole), 20 parts by weight of ethyl acrylate and 75 parts by weight of ethyl acetate, which is a polymerization solvent, were placed and the polyvinyl butyral was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, the obtained solution was applied on top of a PET film subjected to a release treatment, and dried for 1 hour at 80° C. to obtain a film formed of a polyvinyl acetal resin composition.

(Preparation of Interlayer Film)

An interlayer film was prepared by the same procedure as that in Example 1.

(Preparation of Laminated Glass)

A sheet of laminated glass was prepared by the same procedure as that in Example 1.

Example 4

Preparation of Film Formed of Polyvinyl Acetal Resin Composition

In a reaction vessel equipped with a thermometer, a stirrer, a nitrogen inlet tube and a condenser, 5 parts by weight of a polyvinyl acetal resin (a polyvinyl butyral resin, the average polymerization degree of 3300, the butyralization degree of 67.0% by mole, the content ratio of the hydroxyl group of 30.8% by mole, the acetylation degree of 2.2% by mole), 43 parts by weight of ethyl acrylate and 100 parts by weight of ethyl acetate, which is a polymerization solvent, were placed and the polyvinyl acetal resin was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, the obtained solution was applied on top of a PET film subjected to a release treatment, and dried for 1 hour at 80° C. to obtain a film formed of a polyvinyl acetal resin composition.

(Preparation of Interlayer Film)

An interlayer film was prepared by the same procedure as that in Example 1.

(Preparation of Laminated Glass)

A sheet of laminated glass was prepared by the same procedure as that in Example 1.

Example 5

Preparation of Film Formed of Polyvinyl Acetal Resin Composition

In a reaction vessel equipped with a thermometer, a stirrer, a nitrogen inlet tube and a condenser, 20 parts by weight of a polyvinyl acetal resin (a polyvinyl butyral resin, the average polymerization degree of 800, the butyralization degree of 68.0% by mole, the content ratio of the hydroxyl group of 30.8% by mole, the acetylation degree of 1.2% by mole), 25 parts by weight of ethyl acrylate and 65 parts by weight of ethyl acetate, which is a polymerization solvent, were placed and the polyvinyl acetal resin was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, the obtained solution was applied on top of a PET film subjected to a release treatment, and dried for 1 hour at 80° C. to obtain a film formed of a polyvinyl acetal resin composition.

(Preparation of Interlayer Film)

An interlayer film was prepared by the same procedure as that in Example 1.

(Preparation of Laminated Glass)

A sheet of laminated glass was prepared by the same procedure as that in Example 1.

Example 6

Preparation of Film Formed of Polyvinyl Acetal Resin Composition

In a reaction vessel equipped with a thermometer, a stirrer, a nitrogen inlet tube and a condenser, 10 parts by weight of a polyvinyl acetal resin (a polyvinyl butyral resin, the average polymerization degree of 800, the butyralization degree of 68.0% by mole, the content ratio of the hydroxyl group of 30.8% by mole, the acetylation degree of 1.2% by mole), 20 parts by weight of ethyl acrylate and 70 parts by weight of ethyl acetate, which is a polymerization solvent, were placed and the polyvinyl acetal resin was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, the obtained solution was applied on top of a PET film subjected to a release treatment, and dried for 1 hour at 80° C. to obtain a film formed of a polyvinyl acetal resin composition.

(Preparation of Interlayer Film)

An interlayer film was prepared by the same procedure as that in Example 1.

(Preparation of Laminated Glass)

A sheet of laminated glass was prepared by the same procedure as that in Example 1.

Example 7

Preparation of Film Formed of Polyvinyl Acetal Resin Composition

In a reaction vessel equipped with a thermometer, a stirrer, a nitrogen inlet tube and a condenser, 10 parts by weight of a polyvinyl acetal resin (a polyvinyl butyral resin, the average polymerization degree of 800, the butyralization degree of 68.0% by mole, the content ratio of the hydroxyl group of 30.8% by mole, the acetylation degree of 1.2% by mole), 25 parts by weight of ethyl acrylate and 65 parts by weight of ethyl acetate, which is a polymerization solvent, were placed and the polyvinyl acetal resin was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, the obtained solution was applied on top of a PET film subjected to a release treatment, and dried for 1 hour at 80° C. to obtain a film formed of a polyvinyl acetal resin composition.

(Preparation of Interlayer Film)

An interlayer film was prepared by the same procedure as that in Example 1.

(Preparation of Laminated Glass)

A sheet of laminated glass was prepared by the same procedure as that in Example 1.

Example 8

Preparation of Film Formed of Polyvinyl Acetal Resin Composition

In a reaction vessel equipped with a thermometer, a stirrer, a nitrogen inlet tube and a condenser, 10 parts by weight of a polyvinyl acetal resin (a polyvinyl butyral resin, the average polymerization degree of 800, the butyralization degree of 65.0% by mole, the content ratio of the hydroxyl group of 34.0% by mole, the acetylation degree of 1.0% by mole), 6.6 parts by weight of ethyl acrylate, 6 parts by weight of benzyl acrylate, 9 parts by weight of 2-hydroxyethyl acrylate, 8.4 parts by weight of butyl acrylate and 65 parts by weight of ethyl acetate, which is a polymerization solvent, were placed and the polyvinyl acetal resin was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, the obtained solution was applied on top of a PET film subjected to a release treatment, and dried for 1 hour at 80° C. to obtain a film formed of a polyvinyl acetal resin composition.

(Preparation of Interlayer Film)

An interlayer film was prepared by the same procedure as that in Example 1.

(Preparation of Laminated Glass)

A sheet of laminated glass was prepared by the same procedure as that in Example 1.

Example 9

Preparation of Film Formed of Polyvinyl Acetal Resin Composition

In a reaction vessel equipped with a thermometer, a stirrer, a nitrogen inlet tube and a condenser, 10 parts by weight of a polyvinyl acetal resin (a polyvinyl butyral resin, the average polymerization degree of 1700, the butyralization degree of 65.8% by mole, the content ratio of the hydroxyl group of 33.0% by mole, the acetylation degree of 1.2% by mole), 6.6 parts by weight of ethyl acrylate, 6 parts by weight of benzyl acrylate, 9 parts by weight of 2-hydroxyethyl acrylate, 8.4 parts by weight of butyl acrylate and 65 parts by weight of ethyl acetate, which is a polymerization solvent, were placed and the polyvinyl acetal resin was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, the obtained solution was applied on top of a PET film subjected to a release treatment, and dried for 1 hour at 80° C. to obtain a film formed of a polyvinyl acetal resin composition.

(Preparation of Interlayer Film)

An interlayer film was prepared by the same procedure as that in Example 1.

(Preparation of Laminated Glass)

A sheet of laminated glass was prepared by the same procedure as that in Example 1.

Example 10

Preparation of Film Formed of Polyvinyl Acetal Resin Composition

In a reaction vessel equipped with a thermometer, a stirrer, a nitrogen inlet tube and a condenser, 10 parts by weight of a polyvinyl acetal resin (a polyvinyl butyral resin, the average polymerization degree of 2500, the butyralization degree of 68.0% by mole, the content ratio of the hydroxyl group of 30.8% by mole, the acetylation degree of 1.2% by mole), 6.6 parts by weight of ethyl acrylate, 6 parts by weight of benzyl acrylate, 9 parts by weight of 2-hydroxyethyl acrylate, 8.4 parts by weight of butyl acrylate and 65 parts by weight of ethyl acetate, which is a polymerization solvent, were placed and the polyvinyl acetal resin was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, the obtained solution was applied on top of a PET film subjected to a release treatment, and dried for 1 hour at 80° C. to obtain a film formed of a polyvinyl acetal resin composition.

(Preparation of Interlayer Film)

An interlayer film was prepared by the same procedure as that in Example 1.

(Preparation of Laminated Glass)

A sheet of laminated glass was prepared by the same procedure as that in Example 1.

Example 11

Preparation of Film Formed of Polyvinyl Acetal Resin Composition

In a reaction vessel equipped with a thermometer, a stirrer, a nitrogen inlet tube and a condenser, 10 parts by weight of a polyvinyl acetal resin (a polyvinyl butyral resin, the average polymerization degree of 1700, the butyralization degree of 68.0% by mole, the content ratio of the hydroxyl group of 30.8% by mole, the acetylation degree of 1.2% by mole), 15 parts by weight of ethyl acrylate, 6 parts by weight of benzyl acrylate, 9 parts by weight of 4-hydroxybutyl acrylate and 65 parts by weight of ethyl acetate, which is a polymerization solvent, were placed and the polyvinyl acetal resin was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, the obtained solution was applied on top of a PET film subjected to a release treatment, and dried for 1 hour at 80° C. to obtain a film formed of a polyvinyl acetal resin composition.

(Preparation of Interlayer Film)

An interlayer film was prepared by the same procedure as that in Example 1.

(Preparation of Laminated Glass)

A sheet of laminated glass was prepared by the same procedure as that in Example 1.

Example 12

Preparation of Film Formed of Polyvinyl Acetal Resin Composition

In a reaction vessel equipped with a thermometer, a stirrer, a nitrogen inlet tube and a condenser, 10 parts by weight of a polyvinyl acetal resin (a polyvinyl butyral resin, the average polymerization degree of 1700, the butyralization degree of 67.0% by mole, the content ratio of the hydroxyl group of 32.0% by mole, the acetylation degree of 1.0% by mole), 12 parts by weight of ethyl acrylate, 6 parts by weight of benzyl acrylate, 9 parts by weight of 4-hydroxybutyl acrylate, 3 parts by weight of acrylic acid and 65 parts by weight of ethyl acetate, which is a polymerization solvent, were placed and the polyvinyl acetal resin was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, to the obtained solution, triethylene glycol di-2-ethylhexanoate (3GO) as a plasticizer was added so that the content thereof becomes 2% by weight in the resulting interlayer film, and the contents were thoroughly stirred. The obtained solution was applied on top of a PET film subjected to a release treatment, and dried for 1 hour at 80° C. to obtain a film formed of a polyvinyl acetal resin composition.

(Preparation of Interlayer Film)

An interlayer film was prepared by the same procedure as that in Example 1.

(Preparation of Laminated Glass)

A sheet of laminated glass was prepared by the same procedure as that in Example 1.

Example 13

Preparation of Film Formed of Polyvinyl Acetal Resin Composition

In a reaction vessel equipped with a thermometer, a stirrer, a nitrogen inlet tube and a condenser, 10 parts by weight of a polyvinyl acetal resin (a polyvinyl butyral resin, the average polymerization degree of 1700, the butyralization degree of 67.0% by mole, the content ratio of the hydroxyl group of 32.0% by mole, the acetylation degree of 1.0% by mole), 3 parts by weight of ethyl acrylate, 6 parts by weight of benzyl acrylate, 6 parts by weight of butyl acrylate, 9 parts by weight of 4-hydroxybutyl acrylate, 3 parts by weight of acrylic acid, 3 parts by weight of glycidyl methacrylate and 65 parts by weight of ethyl acetate, which is a polymerization solvent, were placed and the polyvinyl acetal resin was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, the obtained solution was applied on top of a PET film subjected to a release treatment, and dried for 1 hour at 80° C. to obtain a film formed of a polyvinyl acetal resin composition.

(Preparation of Interlayer Film)

An interlayer film was prepared by the same procedure as that in Example 1.

(Preparation of Laminated Glass)

A sheet of laminated glass was prepared by the same procedure as that in Example 1.

Example 14

Preparation of Film Formed of Polyvinyl Acetal Resin Composition

In a reaction vessel equipped with a thermometer, a stirrer, a nitrogen inlet tube and a condenser, 10 parts by weight of a polyvinyl acetal resin (a polyvinyl butyral resin, the average polymerization degree of 800, the butyralization degree of 65.2% by mole, the content ratio of the hydroxyl group of 33.9% by mole, the acetylation degree of 0.9% by mole), 30 parts by weight of a polybutadiene elastomer ("RB810" available from JSR Corporation) and 8 parts by weight of triethylene glycol di-2-ethylhexanoate (3GO) as a plasticizer were placed and thoroughly kneaded with a mixing roll to obtain a film formed of a polyvinyl acetal resin composition.

(Preparation of Interlayer Film)

An interlayer film was prepared by the same procedure as that in Example 1.

(Preparation of Laminated Glass)

A sheet of laminated glass was prepared by the same procedure as that in Example 1.

Example 15

Preparation of Film Formed of Polyvinyl Acetal Resin Composition

In a reaction vessel equipped with a thermometer, a stirrer, a nitrogen inlet tube and a condenser, 10 parts by weight of a polyvinyl acetal resin (a polyvinyl butyral resin, the average polymerization degree of 800, the butyralization degree of 65.2% by mole, the content ratio of the hydroxyl group of 33.9% by mole, the acetylation degree of 0.9% by mole) and 30 parts by weight of a styrene/butadiene copolymer ("Tuftec H1221" available from Asahi Kasei Corp.) were placed and thoroughly kneaded with a mixing roll to obtain a film formed of a polyvinyl acetal resin composition.

(Preparation of Interlayer Film)

An interlayer film was prepared by the same procedure as that in Example 1.

(Preparation of Laminated Glass)

A sheet of laminated glass was prepared by the same procedure as that in Example 1.

Example 16

Preparation of Film for Intermediate Layer Formed of Polyvinyl Acetal Resin Composition In a reaction vessel equipped with a thermometer, a stirrer, a nitrogen inlet tube and a condenser, 10 parts by weight of a polyvinyl acetal resin (a polyvinyl butyral resin, the average polymerization degree of 800, the butyralization degree of 65.2% by mole, the content ratio of the hydroxyl group of 33.9% by mole, the acetylation degree of 0.9% by mole), 6.6 parts by weight of ethyl acrylate, 6 parts by weight of benzyl acrylate, 9 parts by weight of 2-hydroxyethyl acrylate, 8.4 parts by weight of butyl acrylate and 60 parts by weight of ethyl acetate, which is a polymerization solvent, were placed and the polyvinyl acetal resin was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, the obtained solution was applied on top of a PET film subjected to a release treatment, and dried for 1 hour at 80° C. to obtain a film formed of a polyvinyl acetal resin composition.

(Preparation of Intermediate Layer (Interlayer Film))

The obtained film formed of the polyvinyl acetal resin composition was molded using an extruder to prepare an intermediate layer for an interlayer film with a thickness of 0.1 mm.

(Preparation of Surface Layer)

One hundred parts by weight of a polyvinyl acetal resin (a polyvinyl butyral resin, the average polymerization degree of 1700, the butyralization degree of 65.2% by mole, the content ratio of the hydroxyl group of 33.9% by mole, the acetylation degree of 0.9% by mole) and 30 parts by weight of triethylene glycol di-2-ethylhexanoate (3GO) as a plasticizer were molded using an extruder to prepare an interlayer film (a surface layer) with a thickness of 0.33 mm.

(Preparation of Interlayer Film)

A surface layer, an intermediate layer and a surface layer were layered in this order to prepare an interlayer film.

(Preparation of Laminated Glass)

A sheet of laminated glass was prepared by the same procedure as that in Example 1.

Example 17

Preparation of Film for Intermediate Layer Formed of Polyvinyl Acetal Resin Composition In a reaction vessel equipped with a thermometer, a stirrer, a nitrogen inlet tube and a condenser, 10 parts by weight of a polyvinyl acetal resin (a polyvinyl butyral resin, the average polymerization degree of 1700, the butyralization degree of 67.0% by mole, the content ratio of the hydroxyl group of 32.0% by mole, the acetylation degree of 1.0% by mole), 6.6 parts by weight of ethyl acrylate, 6 parts by weight of benzyl acrylate, 9 parts by weight of 2-hydroxyethyl acrylate, 8.4 parts by weight of butyl acrylate and 65 parts by weight of ethyl acetate, which is a polymerization solvent, were placed and the polyvinyl acetal resin was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, the obtained solution was applied on top of a PET film subjected to a release treatment, and dried for 1 hour at 80° C. to obtain a film formed of a polyvinyl acetal resin composition.

(Preparation of Interlayer Film)

An interlayer film was prepared by the same procedure as that in Example 16. The surface layer is the same as that in Example 16.

(Preparation of Laminated Glass)

A sheet of laminated glass was prepared by the same procedure as that in Example 1.

Example 18

Preparation of Film for Intermediate Layer Formed of Polyvinyl Acetal Resin Composition In a reaction vessel equipped with a thermometer, a stirrer, a nitrogen inlet tube and a condenser, 10 parts by weight of a polyvinyl acetal resin (a polyvinyl butyral resin, the average polymerization degree of 3300, the butyralization degree of 68.0% by mole, the content ratio of the hydroxyl group of 30.8% by mole, the acetylation degree of 1.2% by mole), 6.6 parts by weight of ethyl acrylate, 6 parts by weight of benzyl acrylate, 9 parts by weight of 2-hydroxyethyl acrylate, 8.4 parts by weight of butyl acrylate and 65 parts by weight of ethyl acetate, which is a polymerization solvent, were placed and the polyvinyl acetal resin was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, the obtained solution was applied on top of a PET film subjected to a release treatment, and dried for 1 hour at 80° C. to obtain a film formed of a polyvinyl acetal resin composition.

(Preparation of Interlayer Film)

An interlayer film was prepared by the same procedure as that in Example 16. The surface layer is the same as that in Example 16.

(Preparation of Laminated Glass)

A sheet of laminated glass was prepared by the same procedure as that in Example 1.

Example 19

Preparation of Film for Intermediate Layer Formed of Polyvinyl Acetal Resin Composition In a reaction vessel equipped with a thermometer, a stirrer, a nitrogen inlet tube and a condenser, 10 parts by weight of a polyvinyl acetal resin (a polyvinyl butyral resin, the average polymerization degree of 800, the butyralization degree of 65.2% by mole, the content ratio of the hydroxyl group of 33.9% by mole, the acetylation degree of 0.9% by mole), 8.4 parts by weight of ethyl acrylate, 6 parts by weight of benzyl acrylate, 9 parts by weight of 2-hydroxyethyl acrylate, 6.6 parts by weight of butyl acrylate and 65 parts by weight of ethyl acetate, which is a polymerization solvent, were placed and the polyvinyl acetal resin was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, to the obtained solution, triethylene glycol di-2-ethylhexanoate (3GO) as a plasticizer was added so that the content thereof becomes 1% by weight in the resulting interlayer film, and the contents were thoroughly stirred. The obtained solution was applied on top of a PET film subjected to a release treatment, and dried for 1 hour at 80° C. to obtain a film formed of a polyvinyl acetal resin composition.

(Preparation of Interlayer Film)

An interlayer film was prepared by the same procedure as that in Example 16. The surface layer is the same as that in Example 16.

(Preparation of Laminated Glass)

A sheet of laminated glass was prepared by the same procedure as that in Example 1.

Example 20

Preparation of Film for Intermediate Layer Formed of Polyvinyl Acetal Resin Composition In a reaction vessel equipped with a thermometer, a stirrer, a nitrogen inlet tube and a condenser, 10 parts by weight of a polyvinyl acetal resin (a polyvinyl butyral resin, the average polymerization degree of 1700, the butyralization degree of 67.0% by mole, the content ratio of the hydroxyl group of 32.0% by mole, the acetylation degree of 1.0% by mole), 8.4 parts by weight of ethyl acrylate, 6 parts by weight of benzyl acrylate, 9 parts by weight of 2-hydroxyethyl acrylate, 6.6 parts by weight of butyl acrylate and 65 parts by weight of ethyl acetate, which is a polymerization solvent, were placed and the polyvinyl acetal resin was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, to the obtained solution, triethylene glycol di-2-ethylhexanoate (3GO) as a plasticizer was added so that the content thereof becomes 2% by weight in the resulting interlayer film, and the contents were thoroughly stirred. The obtained solution was applied on top of a PET film subjected to a release treatment, and dried for 1 hour at 80° C. to obtain a film formed of a polyvinyl acetal resin composition.

(Preparation of Interlayer Film)

An interlayer film was prepared by the same procedure as that in Example 16. The surface layer is the same as that in Example 16.

(Preparation of Laminated Glass)

A sheet of laminated glass was prepared by the same procedure as that in Example 1.

Comparative Example 1

In Comparative Example 1, no second resin component was used.

(Preparation of Film Formed of Polyvinyl Acetal Resin)

Forty parts by weight of a polyvinyl acetal resin (a polyvinyl butyral resin, the average polymerization degree of 800, the butyralization degree of 67.0% by mole, the content ratio of the hydroxyl group of 32.0% by mole, the acetylation degree of 1.0% by mole) were diluted with a solvent (a mixed solvent of methanol and toluene, methanol:toluene=1:1 (weight ratio)) to obtain a solution with a solid content of 20% by weight. To the obtained solution, 2.5 parts by weight of dioctyl phthalate (the content of which is 5.9% by weight in the resulting interlayer film), which is a plasticizer, were added. Next, the solution prepared by being added with the plasticizer was applied on top of a PET film subjected to a release treatment, and dried for 1 hour at 80° C. to obtain a film formed of the polyvinyl acetal resin and the plasticizer.

(Preparation of Interlayer Film)

An interlayer film was prepared by the same procedure as that in Example 1.

(Preparation of Laminated Glass)

A sheet of laminated glass was prepared by the same procedure as that in Example 1.

Comparative Example 2

In Comparative Example 2, no second resin component was used.

(Preparation of Resin Composition (1) for Forming Sound Insulating Layer (1))

To 100 parts by weight of a polyvinyl acetal resin (a polyvinyl butyral resin, the average polymerization degree of 2100, the butyralization degree of 65% by mole, the content ratio of the hydroxyl group of 22% by mole, the acetylation degree of 13% by mole), 30 parts by weight of triethylene glycol-di-2-ethylhexanoate (3GO), which is a plasticizer, were added and thoroughly kneaded with a mixing roll to prepare a resin composition (1).

(Preparation of Resin Composition (2) for Forming Sound Insulating Layer (2))

To 100 parts by weight of a polyvinyl acetal resin (a polyvinyl butyral resin, the average polymerization degree of 2100, the butyralization degree of 65% by mole, the content ratio of the hydroxyl group of 22% by mole, the acetylation degree of 13% by mole), 60 parts by weight of triethylene glycol-di-2-ethylhexanoate (3GO), which is a plasticizer, were added and thoroughly kneaded with a mixing roll to prepare a resin composition (2).

(Preparation of Resin Composition (3) for Forming Intermediate Layer)

To 100 parts by weight of a polyvinyl acetal resin (a polyvinyl butyral resin, the average polymerization degree of 1700, the butyralization degree of 65% by mole, the content ratio of the hydroxyl group of 34% by mole, the acetylation degree of 1% by mole), 40 parts by weight of triethylene glycol-di-2-ethylhexanoate (3GO), which is a plasticizer, were added and thoroughly kneaded with a mixing roll to prepare a resin composition (3).

(Preparation of Interlayer Film)

A resin composition (1) was sandwiched between two fluororesin sheets together with a clearance plate (100 μm in thickness) interposed therein, and the sheets were press-molded at 150° C. to obtain a sound insulating layer (1) with a thickness of 100 μm.

A resin composition (2) was sandwiched between two fluororesin sheets together with a clearance plate (100 μm in thickness) interposed therein, and the sheets were press-molded at 150° C. to obtain a sound insulating layer (2) with a thickness of 100 μm.

A resin composition (3) was sandwiched between two fluororesin sheets together with a clearance plate (600 μm in thickness) interposed therein, and the sheets were press-molded at 150° C. to obtain an intermediate layer with a thickness of 600 μm.

A laminate in which the sound insulating layer (1), the intermediate layer and the sound insulating layer (2) are layered in this order was sandwiched between two fluororesin sheets together with a clearance plate (800 μm in thickness) interposed therein, and the sheets were press-molded at 150° C. to obtain an interlayer film for laminated glass with a thickness of 800 μm.

(Preparation of Laminated Glass)

The obtained interlayer film was cut into a size of 30 mm in longitudinal length by 320 mm in transversal length. Next, the interlayer film was sandwiched between two sheets of transparent float glass (25 mm in longitudinal length by 305 mm in transversal length by 2.0 mm in thickness), the sheets were put into a rubber bag, and the inside thereof was degassed for 20 minutes at a degree of vacuum of 2.6 kPa, after which the sheets were pressed under vacuum for 30 minutes at 90° C. The sheets thus preliminarily press-bonded were subjected to press-bonding for 20 minutes under conditions of 135° C. and a pressure of 1.2 MPa in an autoclave to prepare a laminate. With regard to the laminate, interlayer film portions protruded from the sheet of glass were cut away to obtain a sheet of laminated glass used for the measurement of the loss factor.

Comparative Example 3

In Comparative Example 3, an interlayer film having no sea-island structure was prepared.

(Preparation of Film Formed of Polyvinyl Acetal Resin Composition)

Ten parts by weight of a polyvinyl acetal resin (a polyvinyl butyral resin, the average polymerization degree of 1700, the butyralization degree of 67.0% by mole, the content ratio of the hydroxyl group of 32.0% by mole, the acetylation degree of 1.0% by mole) were diluted with a solvent (a mixed solvent of methanol and toluene, methanol:toluene=1:1 (weight ratio)) to obtain a solution with a solid content of 20% by weight. Next, the obtained solution was applied on top of a PET film subjected to a release treatment, air-dried for 1 hour at ordinary temperature (23° C.), and then, dried for 1 hour at 80° C. in a hot air dryer to obtain a film formed of a polyvinyl acetal resin.

Next, 30 parts by weight of ethyl acrylate and 100 parts by weight of ethyl acetate, which is a polymerization solvent, were placed in a reaction vessel equipped with a thermometer, a stirrer, a nitrogen inlet tube and a condenser, and then, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled to obtain a resin solution. The obtained resin solution was applied on top of a PET film subjected to a release treatment, and dried for 1 hour at 80° C. to obtain a film formed of a polyacrylic acid ester resin.

(Preparation of Interlayer Film)

The obtained film formed of the polyvinyl acetal resin was molded using an extruder to prepare a single-layered interlayer film with a thickness of 0.125 mm. Next, the obtained film formed of the polyacrylic acid ester resin was molded using an extruder to prepare a single-layered interlayer film with a thickness of 0.375 mm.

(Preparation of Laminated Glass)

The obtained two interlayer films were layered and a sheet of laminated glass was prepared by the same procedure as that in Example 1.

Comparative Example 4

In Comparative Example 4, no second resin component was used. As a resin component similar to the second resin component, a resin component with a glass transition temperature of 15° C. was used.

(Preparation of Film Formed of Polyvinyl Acetal-Based Resin Composition)

In a reaction vessel equipped with a thermometer, a stirrer, a nitrogen inlet tube and a condenser, 10 parts by weight of a polyvinyl acetal resin (a polyvinyl butyral resin, the average polymerization degree of 1700, the butyralization degree of 68.0% by mole, the content ratio of the hydroxyl group of 30.8% by mole, the acetylation degree of 1.2% by mole), 40 parts by weight of benzyl acrylate and 60 parts by weight of ethyl acetate, which is a polymerization solvent, were placed and the polyvinyl acetal resin was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, the obtained solution was applied on top of a PET film subjected to a release treatment, and dried for 1 hour at 80° C. to obtain a film formed of a polyvinyl acetal resin composition.

(Preparation of Interlayer Film)

An interlayer film was prepared by the same procedure as that in Example 1.

(Preparation of Laminated Glass)

A sheet of laminated glass was prepared by the same procedure as that in Example 1.

Comparative Example 5

In Comparative Example 5, a larger amount of the polyvinyl acetal resin and a smaller amount of the second resin component were used.

(Preparation of Film Formed of Polyvinyl Acetal-Based Resin Composition)

In a reaction vessel equipped with a thermometer, a stirrer, a nitrogen inlet tube and a condenser, 25 parts by weight of a polyvinyl acetal resin (a polyvinyl butyral resin, the average polymerization degree of 800, the butyralization degree of 68.0% by mole, the content ratio of the hydroxyl group of 30.8% by mole, the acetylation degree of 1.2% by mole), 15 parts by weight of ethyl acrylate and 60 parts by weight of ethyl acetate, which is a polymerization solvent, were placed and the polyvinyl acetal resin was dissolved with stirring.

Next, nitrogen gas was blown into the reaction vessel for 30 minutes to replace the inner atmosphere thereof with nitrogen, after which the contents in the reaction vessel were heated to 85° C. with stirring. After heated for 30 minutes, a polymerization initiator solution prepared by diluting 0.1 part by weight of t-butyl peroxy-2-ethylhexanoate, which is a polymerization initiator, with 5 parts by weight of ethyl acetate was added dropwise to the inside of the reaction vessel over a period of 3 hours. Afterward, the contents were allowed to undergo a reaction for an additional 3 hours at 85° C. Then, the reaction liquid was cooled. The obtained solution was diluted with a dilution solvent (a mixed solvent of methanol and toluene, methanol:toluene=1:2 (weight ratio)) to obtain a solution with a solid content of 20% by weight. Next, the obtained solution was applied on top of a PET film subjected to a release treatment, and dried for 1 hour at 80° C. to obtain a film formed of a polyvinyl acetal resin composition.

(Preparation of Interlayer Film)

An interlayer film was prepared by the same procedure as that in Example 1.

(Preparation of Laminated Glass)

A sheet of laminated glass was prepared by the same procedure as that in Example 1.

(Evaluation)

(Measurement of Glass Transition Temperature)

The glass transition temperature of the resin used was measured in the following way.

The resin was formed into a film with a thickness greater than or equal to 0.5 mm by heat-pressing. The obtained film was cut out into a circular shape with a diameter of 8 mm. Then, by performing a temperature dispersion measurement of the dynamic viscoelasticity at a temperature increasing rate of 5° C./minute under conditions of a strain quantity of 1.0% and a frequency of 1 Hz by a shearing method using a viscoelasticity measuring apparatus ("ARES" available from Rheometric Scientific, Inc.), the glass transition temperature was measured.

(Evaluation of Dynamic Viscoelasticity)

The obtained interlayer film was cut out into a circular shape with a diameter of 8 mm. Then, by performing a temperature dispersion measurement of the dynamic viscoelasticity at a temperature increasing rate of 5° C./minute under conditions of a strain quantity of 1.0% and a frequency of 1 Hz by a shearing method using a viscoelasticity measuring apparatus ("ARES" available from Rheometric Scientific, Inc.), the peak temperature of the loss tangent observed at the lowest temperature side, and the largest value (maximum value) of the loss tangent in the peak temperature of the loss tangent observed at the lowest temperature side were measured.

(Confirmation of Sea-Island Structure)

The obtained interlayer film was processed by means of a microtome to prepare a slice with a thickness of 100 nm or so. By allowing the obtained slice to be dyed with osmium tetraoxide and observed with a transmission electron microscope, it was confirmed whether the resin constituting the sea part of the sea-island structure is a polyvinyl acetal resin (PVB) or a second resin component (R2).

(Evaluation of Loss Factor)

With regard to the obtained sheet of laminated glass, using a measuring apparatus ("SA-01" available from RION Co., Ltd.), a loss factor was measured by a central exciting method under a condition of 20° C. A loss factor (20° C. loss factor) at a quaternary mode (about 3150 Hz) of a resonance frequency of the loss factor obtained was evaluated.

Moreover, a loss factor was measured by a central exciting method also under a condition of 30° C. A loss factor (30° C. loss factor) at a senary mode (about 6300 Hz) of a resonance frequency of the loss factor obtained was evaluated.

(Evaluation of Stability)

The obtained sheet of laminated glass was preserved for 1 month at 23° C., after which the 20° C. loss factor and the 30° C. loss factor were measured.

The results are shown in the following Tables 1 to 3.

TABLE 1

| | | | Example | | | | | |
|---|---|---|---|---|---|---|---|---|
| | | | 1 | 2 | 3 | 4 | 5 | 6 |
| Polyvinyl acetal resin | Polyvinyl butyral resin | Addition amount (parts by weight) | 10 | 10 | 5 | 5 | 20 | 10 |
| | | Average polymerization degree | 1700 | 1700 | 1700 | 3300 | 800 | 800 |
| | | Butyralization degree (% by mole) | 67.0 | 68.0 | 67.0 | 67.0 | 68.0 | 68.0 |
| | | Content ratio of hydroxyl group (% by mole) | 32.0 | 30.8 | 32.0 | 30.8 | 30.8 | 30.8 |
| | Glass transition temperature (° C.) | | 65 | 64 | 65 | 65 | 64 | 64 |
| Second resin component | Ethyl acrylate | Addition amount (parts by weight) | 30 | 15 | 20 | 43 | 25 | 20 |
| | 2-Ethylhexyl acrylate | Addition amount (parts by weight) | 0 | 7.5 | 0 | 0 | 0 | 0 |
| | Benzyl acrylate | Addition amount (parts by weight) | 0 | 7.5 | 0 | 0 | 0 | 0 |
| | 2-Hydroxyethyl acrylate | Addition amount (parts by weight) | 0 | 0 | 0 | 0 | 0 | 0 |
| | Butyl acrylate | Addition amount (parts by weight) | 0 | 0 | 0 | 0 | 0 | 0 |
| | 4-Hydroxybutyl acrylate | Addition amount (parts by weight) | 0 | 0 | 0 | 0 | 0 | 0 |
| | Acrylic acid | Addition amount (parts by weight) | 0 | 0 | 0 | 0 | 0 | 0 |
| | Glycidyl methacrylate | Addition amount (parts by weight) | 0 | 0 | 0 | 0 | 0 | 0 |
| | Polybutadiene elastomer | Addition amount (parts by weight) | 0 | 0 | 0 | 0 | 0 | 0 |

TABLE 1-continued

|  |  |  |  |  |  |  |  |  |
|---|---|---|---|---|---|---|---|---|
|  | Styrene/butadiene copolymer | Addition amount (parts by weight) | 0 | 0 | 0 | 0 | 0 | 0 |
|  | Glass transition temperature (° C.) |  | −4.0 | −8.0 | −4.0 | −4.0 | −4.0 | −4.0 |
| Evaluation of dynamic viscoelasticity | Peak temperature (° C.) of tan δ observed at the lowest temperature side |  | −4 | −8 | −4 | −4 | −4 | −4 |
|  | Largest value (maximum value) of tan δ in the peak temperature of tan δ observed at the lowest temperature side |  | 1.4 | 1.2 | 1.5 | 1.3 | 0.9 | 1.2 |
| Transmission electron microscope observation | Kind of resin constituting sea part of sea-island structure |  | PVB | PVB | R2 | R2 | PVB | R2 |
| Evaluation of loss factor | 20° C. Loss factor |  | 0.4 | 0.34 | 0.43 | 0.36 | 0.30 | 0.44 |
|  | 30° C. Loss factor |  | 0.19 | 0.2 | 0.22 | 0.21 | 0.18 | 0.25 |
| Evaluation of stability | 20° C. Loss factor (after 1 month) |  | 0.4 | 0.34 | 0.43 | 0.36 | 0.30 | 0.44 |
|  | 30° C. Loss factor (after 1 month) |  | 0.19 | 0.2 | 0.23 | 0.21 | 0.18 | 0.25 |

|  |  |  | Example |  |  |  |  |
|---|---|---|---|---|---|---|---|
|  |  |  | 7 | 8 | 9 | 10 | 11 |
| Polyvinyl acetal resin | Polyvinyl butyral resin | Addition amount (parts by weight) | 10 | 10 | 10 | 10 | 10 |
|  |  | Average polymerization degree | 800 | 800 | 1700 | 2500 | 1700 |
|  |  | Butyralization degree (% by mole) | 68.0 | 65.0 | 65.8 | 68.0 | 68.0 |
|  |  | Content ratio of hydroxyl group (% by mole) | 30.8 | 34.0 | 33.0 | 30.8 | 30.8 |
|  | Glass transition temperature (° C.) |  | 64 | 68 | 67 | 65 | 64 |
| Second resin component | Ethyl acrylate | Addition amount (parts by weight) | 25 | 6.6 | 6.6 | 6.6 | 15 |
|  | 2-Ethylhexyl acrylate | Addition amount (parts by weight) | 0 | 0 | 0 | 0 | 0 |
|  | Benzyl acrylate | Addition amount (parts by weight) | 0 | 6 | 6 | 6 | 6 |
|  | 2-Hydroxyethyl acrylate | Addition amount (parts by weight) | 0 | 9 | 9 | 9 | 0 |
|  | Butyl acrylate | Addition amount (parts by weight) | 0 | 8.4 | 8.4 | 8.4 | 0 |
|  | 4-Hydroxybutyl acrylate | Addition amount (parts by weight) | 0 | 0 | 0 | 0 | 9 |
|  | Acrylic acid | Addition amount (parts by weight) | 0 | 0 | 0 | 0 | 0 |
|  | Glycidyl methacrylate | Addition amount (parts by weight) | 0 | 0 | 0 | 0 | 0 |
|  | Polybutadiene elastomer | Addition amount (parts by weight) | 0 | 0 | 0 | 0 | 0 |
|  | Styrene/butadiene copolymer | Addition amount (parts by weight) | 0 | 0 | 0 | 0 | 0 |
|  | Glass transition temperature (° C.) |  | −4.0 | −3.7 | −4.7 | −5.7 | −6.0 |
| Evaluation of dynamic viscoelasticity | Peak temperature (° C.) of tan δ observed at the lowest temperature side |  | −4 | −4 | −5 | −6 | −6 |
|  | Largest value (maximum value) of tan δ in the peak temperature of tan δ observed at the lowest temperature side |  | 1.5 | 0.5 | 0.7 | 0.9 | 0.7 |
| Transmission electron microscope observation | Kind of resin constituting sea part of sea-island structure |  | R2 | PVB | R2 | R2 | PVB |
| Evaluation of loss factor | 20° C. Loss factor |  | 0.54 | 0.33 | 0.36 | 0.40 | 0.34 |
|  | 30° C. Loss factor |  | 0.22 | 0.21 | 0.21 | 0.24 | 0.2 |
| Evaluation of stability | 20° C. Loss factor (after 1 month) |  | 0.54 | 0.33 | 0.36 | 0.40 | 0.34 |
|  | 30° C. Loss factor (after 1 month) |  | 0.22 | 0.21 | 0.21 | 0.24 | 0.21 |

TABLE 2

| | | | Example | | | | | | | | |
|---|---|---|---|---|---|---|---|---|---|---|---|
| | | | 12[X·1] | 13 | 14[X·1] | 15 | 16[X·4] | 17[X·4] | 18[X·4] | 19[X·2] | 20[X·2] |
| Polyvinyl acetal resin | Polyvinyl butyral resin | Addition amount (parts by weight) | 10 | 10 | 10 | 10 | 10 | 10 | 10 | 10 | 10 |
| | | Average polymerization degree | 1700 | 1700 | 800 | 800 | 800 | 1700 | 3300 | 800 | 1700 |
| | | Butyralization degree (% by mole) | 67.0 | 67.0 | 65.2 | 65.2 | 65.2 | 67.0 | 68.0 | 65.2 | 67.0 |
| | | Content ratio of hydroxyl group (% by mole) | 32.0 | 32.0 | 33.9 | 33.9 | 33.9 | 32.0 | 30.8 | 33.9 | 32.0 |
| | | Glass transition temperature (° C.) | 68 | 66 | 60 | 69 | 69 | 67 | 66 | 68 | 68 |
| Second resin component | Ethyl acrylate | Addition amount (parts by weight) | 12 | 3 | 0 | 0 | 6.6 | 6.6 | 6.6 | 8.4 | 8.4 |
| | 2-Ethylhexyl acrylate | Addition amount (parts by weight) | 0 | 0 | 0 | 0 | 0 | 0 | 0 | 0 | 0 |
| | Benzyl acrylate | Addition amount (parts by weight) | 6 | 6 | 0 | 0 | 6 | 6 | 6 | 6 | 6 |
| | 2-Hydroxyethyl acrylate | Addition amount (parts by weight) | 0 | 0 | 0 | 0 | 9 | 9 | 9 | 9 | 9 |
| | Butyl acrylate | Addition amount (parts by weight) | 0 | 6 | 0 | 0 | 8.4 | 8.4 | 8.4 | 6.6 | 6.6 |
| | 4-Hydroxybutyl acrylate | Addition amount (parts by weight) | 9 | 9 | 0 | 0 | 0 | 0 | 0 | 0 | 0 |
| | Acrylic acid | Addition amount (parts by weight) | 3 | 3 | 0 | 0 | 0 | 0 | 0 | 0 | 0 |
| | Glycidyl methacrylate | Addition amount (parts by weight) | 0 | 3 | 0 | 0 | 0 | 0 | 0 | 0 | 0 |
| | Polybutadiene elastomer | Addition amount (parts by weight) | 0 | 0 | 30 | 0 | 0 | 0 | 0 | 0 | 0 |
| | Styrene/butadiene copolymer | Addition amount (parts by weight) | 0 | 0 | 0 | 30 | 0 | 0 | 0 | 0 | 0 |
| | | Glass transition temperature (° C.) | −3.2 | −2.2 | −2.7 | −13 | −5.7 | −4.7 | −4.2 | −5.7 | −6.7 |
| Evaluation of dynamic viscoelasticity | | Peak temperature (° C.) of tan δ observed at the lowest temperature side | −3 | −2 | −3 | −13 | −6 | −5 | −4 | −6 | −7 |
| | | Largest value (maximum value) of tan δ in the peak temperature of tan δ observed at the lowest temperature side | 0.6 | 0.5 | 0.7 | 0.9 | 0.35 | 0.7 | 1.0 | 0.5 | 0.7 |
| Transmission electron microscope observation | | Kind of resin constituting sea part of sea-island structure | R2 | R2 | R2 | R2 | PVB | R2 | R2 | PVB | R2 |
| Evaluation of loss factor | | 20° C. Loss factor | 0.38 | 0.32 | 0.30 | 0.24 | 0.24 | 0.38 | 0.36 | 0.31 | 0.33 |
| | | 30° C. Loss factor | 0.22 | 0.26 | 0.25 | 0.17 | 0.18 | 0.22 | 0.21 | 0.21 | 0.22 |
| Evaluation of stability | | 20° C. Loss factor (after 1 month) | 0.38 | 0.32 | 0.30 | 0.23 | 0.24 | 0.38 | 0.36 | 0.31 | 0.33 |
| | | 30° C. Loss factor (after 1 month) | 0.22 | 0.26 | 0.25 | 0.17 | 0.18 | 0.22 | 0.21 | 0.21 | 0.23 |

[X·1] Plasticizer-including single-layered interlayer film
[X·2] Plasticizer-including three-layered interlayer film
[X·3] Sea-island structure is not formed
[X·4] Three-layered interlayer film having intermediate layer containing no plasticizer

TABLE 3

| | | | Comparative Example | | | | |
|---|---|---|---|---|---|---|---|
| | | | 1[X·1] | 2[X·2] | 3[X·3] | 4 | 5 |
| Polyvinyl acetal resin | Polyvinyl butyral resin | Addition amount (parts by weight) | 40 | — | 10 | 10 | 25 |
| | | Average polymerization degree | 800 | — | 1700 | 1700 | 800 |
| | | Butyralization degree (% by mole) | 67.0 | — | 67.0 | 68.0 | 68.0 |
| | | Content ratio of hydroxyl group (% by mole) | 32.0 | — | 32.0 | 30.8 | 30.8 |
| | | Glass transition temperature (° C.) | 65 | — | 65 | 64 | 64 |
| Second resin | Ethyl acrylate | Addition amount (parts by weight) | 0 | 0 | 30 | 0 | 15 |

TABLE 3-continued

| | | | Comparative Example | | | | |
|---|---|---|---|---|---|---|---|
| | | | 1[X.1] | 2[X.2] | 3[X.3] | 4 | 5 |
| component | 2-Ethylhexyl acrylate | Addition amount (parts by weight) | 0 | 0 | 0 | 0 | 0 |
| | Benzyl acrylate | Addition amount (parts by weight) | 0 | 0 | 0 | 40 | 0 |
| | 2-Hydroxyethyl acrylate | Addition amount (parts by weight) | 0 | 0 | 0 | 0 | 0 |
| | Butyl acrylate | Addition amount (parts by weight) | 0 | 0 | 0 | 0 | 0 |
| | 4-Hydroxybutyl acrylate | Addition amount (parts by weight) | 0 | 0 | 0 | 0 | 0 |
| | Acrylic acid | Addition amount (parts by weight) | 0 | 0 | 0 | 0 | 0 |
| | Glycidyl methacrylate | Addition amount (parts by weight) | 0 | 0 | 0 | 0 | 0 |
| | Polybutadiene elastomer | Addition amount (parts by weight) | 0 | 0 | 0 | 0 | 0 |
| | Styrene/butadiene copolymer | Addition amount (parts by weight) | 0 | 0 | 0 | 0 | 0 |
| | Glass transition temperature (° C.) | | — | — | −4.0 | 15 | −4.0 |
| Evaluation of dynamic viscoelasticity | Peak temperature (° C.) of tan δ observed at the lowest temperature side | | 32 | −3 | −4 | 15 | −4 |
| | Largest value (maximum value) of tan δ in the peak temperature of tan δ observed at the lowest temperature side | | 1.4 | 1.2 | 1.4 | 1.2 | 0.7 |
| Transmission electron microscope observation | Kind of resin constituting sea part of sea-island structure | | — | — | — | R2 | PVB |
| Evaluation of loss factor | 20° C. Loss factor | | 0.1 | 0.24 | 0.28 | 0.18 | 0.18 |
| | 30° C. Loss factor | | 0.03 | 0.2 | 0.14 | 0.11 | 0.09 |
| Evaluation of stability | 20° C. Loss factor (after 1 month) | | 0.08 | 0.31 | 0.28 | 0.18 | 0.18 |
| | 30° C. Loss factor (after 1 month) | | 0.02 | 0.12 | 0.14 | 0.11 | 0.1 |

[X.1] Plasticizer-including single-layered interlayer film
[X.2] Plasticizer-including three-layered interlayer film
[X.3] Sea-island structure is not formed
[X.4] Three-layered interlayer film having intermediate layer containing no plasticizer

EXPLANATION OF SYMBOLS

1: Laminated glass
2: Interlayer film
2a: First surface
2b: Second surface
11: Laminated glass
12: Interlayer film
13: First layer (Interlayer film)
14: Second layer (Interlayer film)
15: Third layer (Interlayer film)
13a: Outer surface
15a: Outer surface
21: First laminated glass member
22: Second laminated glass member

The invention claimed is:

1. An interlayer film for laminated glass,
the interlayer film which is arranged between a first lamination glass member and a second lamination glass member to obtain a laminated glass, the laminated glass being at least one selected from the group consisting of a windshield, side glass, rear glass, and roof glass of an automobile,
said interlayer film having a thickness of greater than or equal to 0.1 mm,
said interlayer film comprising a polyvinyl acetal resin and a second resin component with a glass transition temperature higher than or equal to −15° C. and lower than or equal to −2.2° C., the second resin component being a (meth)acrylic resin,
said interlayer film further comprising a compatibilizer which comprises a block copolymer or a graft copolymer of a polyvinyl acetal resin and a (meth)acrylate; and
the content of the polyvinyl acetal resin being greater than or equal to 10% by weight and less than or equal to 50% by weight and the content of the second resin component being greater than or equal to 50% by weight and less than or equal to 90% by weight, in 100% by weight of the total of the polyvinyl acetal resin and the second resin component,
the polyvinyl acetal resin and the second resin component forming a sea-island structure in the interlayer film, and
a resin constituting a sea part of the sea-island structure being the polyvinyl acetal resin.

2. The interlayer film for laminated glass according to claim 1, wherein the temperature showing the maximum value of the loss tangent derived from the polyvinyl acetal resin is higher than or equal to 50° C., the temperature showing the maximum value of the loss tangent derived from the second resin component is higher than or equal to −15° C. and lower than or equal to 5° C., and the maximum value of the loss tangent derived from the second resin component is greater than or equal to 0.4, in a dynamic viscoelastic spectrum at the frequency of 1 Hz.

3. The interlayer film for laminated glass according to claim 1, wherein at least a part of the polyvinyl acetal resin and at least a part of the second resin component are polymerized with each other.

4. The interlayer film for laminated glass according to claim 1, wherein the second resin component is obtained by allowing monomers having a (meth)acryloyl group to undergo a polymerization in the presence of the polyvinyl acetal resin.

5. The interlayer film for laminated glass according to claim 1, further comprising at least one selected from the group consisting of an oxidation inhibitor, an ultraviolet ray shielding agent, a light stabilizer, a flame retardant, a pigment, a dye, an adhesive force regulating agent, a moisture-resistance agent, a fluorescent brightening agent, and an infrared ray absorber.

6. The interlayer film for laminated glass according to claim 1, wherein the compatibilizer is present in an amount of greater than or equal to 0.01 parts by weight and less than or equal to 20 parts by weight relative to 100 parts by weight of the total of the polyvinyl acetal resin and the second resin component.

7. The interlayer film for laminated glass according to claim 1, further comprising no plasticizer or a plasticizer in an amount less than or equal to 40% by weight in 100% by weight of the interlayer film.

8. The interlayer film for laminated glass according to claim 7, wherein the interlayer film for laminated glass comprises the plasticizer, and the plasticizer is selected from the group consisting of triethylene glycol di-2-ethylhexanoate, triethylene glycol di-2-ethylbutyrate, and triethylene glycol di-2-ethylpropanoate.

9. The interlayer film for laminated glass according to claim 7, comprising no plasticizer or a plasticizer in an amount less than or equal to 20% by weight in 100% by weight of the interlayer film.

10. The interlayer film for laminated glass according to claim 9, comprising no plasticizer or a plasticizer in an amount less than or equal to 10% by weight in 100% by weight of the interlayer film.

11. The interlayer film for laminated glass according to claim 10, comprising no plasticizer.

12. A laminated glass being at least one selected from the group consisting of a windshield, side glass, rear glass, and roof glass of an automobile,
said laminated glass comprising:
a first laminated glass member,
a second laminated glass member and
an interlayer film for laminated glass,
the interlayer film for laminated glass being arranged between the first laminated glass member and the second laminated glass member,
said interlayer film having a thickness of greater than or equal to 0.1 mm,
said interlayer film comprising a polyvinyl acetal resin and a second resin component with a glass transition temperature higher than or equal to −15° C. and lower than or equal to −2.2° C., the second resin component being a (meth)acrylic resin; and
the content of the polyvinyl acetal resin being greater than or equal to 10% by weight and less than or equal to 50% by weight and the content of the second resin component being greater than or equal to 50% by weight and less than or equal to 90% by weight, in 100% by weight of the total of the polyvinyl acetal resin and the second resin component, in the interlayer film,
the polyvinyl acetal resin and the second resin component forming a sea-island structure in the interlayer film, and
a resin constituting a sea part of the sea-island structure being the polyvinyl acetal resin.

13. The laminated glass according to claim 12, wherein the temperature showing the maximum value of the loss tangent derived from the polyvinyl acetal resin is higher than or equal to 50° C., the temperature showing the maximum value of the loss tangent derived from the second resin component is higher than or equal to −15° C. and lower than or equal to 5° C., and the maximum value of the loss tangent derived from the second resin component is greater than or equal to 0.4, in a dynamic viscoelastic spectrum at the frequency of 1 Hz of the interlayer film.

14. The laminated glass according to claim 12, wherein at least a part of the polyvinyl acetal resin and at least a part of the second resin component are polymerized with each other.

15. The laminated glass according to claim 12, wherein the second resin component is obtained by allowing monomers having a (meth)acryloyl group to undergo a polymerization in the presence of the polyvinyl acetal resin.

16. The laminated glass according to claim 12, wherein the interlayer film further comprises no plasticizer or a plasticizer in an amount less than or equal to 40% by weight in 100% by weight of the interlayer film.

17. The laminated glass according to claim 16, wherein the interlayer film comprises no plasticizer or a plasticizer in an amount less than or equal to 20% by weight in 100% by weight of the interlayer film.

18. The laminated glass according to claim 17, wherein the interlayer film comprises no plasticizer or a plasticizer in an amount less than or equal to 10% by weight in 100% by weight of the interlayer film.

19. The laminated glass according to claim 18, wherein the interlayer film comprises no plasticizer.

\* \* \* \* \*